Aug. 18, 1959 | S. M. RUBENS | 2,900,282

METHOD OF TREATING MAGNETIC MATERIAL AND RESULTING ARTICLES

Filed July 20, 1956 | 2 Sheets-Sheet 1

INVENTOR

SIDNEY M. RUBENS

BY Cushman, Darby & Cushman

ATTORNEYS

Aug. 18, 1959 S. M. RUBENS 2,900,282

METHOD OF TREATING MAGNETIC MATERIAL
AND RESULTING ARTICLES

Filed July 20, 1956 2 Sheets-Sheet 2

INVENTOR

SIDNEY M. RUBENS

BY Cushman, Darby & Cushman
ATTORNEYS

United States Patent Office 2,900,282

Patented Aug. 18, 1959

2,900,282

METHOD OF TREATING MAGNETIC MATERIAL AND RESULTING ARTICLES

Sidney M. Rubens, St. Paul, Minn., assignor to Sperry Rand Corporation, New York, N.Y., a corporation of Delaware Application July 20, 1956, Serial No. 599,100

13 Claims. (Cl. 117—227)

This invention relates to a method of evaporating magnetic materials and condensing the evaporating material in the presence of a magnetic field, to annealing masses of magnetic materials in magnetic fields, and to articles of manufacture resulting from such methods.

It has been previously discovered that magnetic materials may be evaporated in an evacuation zone and allowed to condense so as to reduce the thickness of the resulting magnetic material significantly; for example, see Review of Modern Physics, vol. 25, No. 1, January 1953, pages 310–315, Crittenden and Hoffman. One basic aspect of the present invention is the discovery that, if the condensation of the metal is made to occur in a magnetic field, rectangular hysteresis loops having squareness ratios of $B_r/B_{max}$ where $B_r$ is the remanent magnetic induction and $B_{max}$ is the maximum magnetic induction of 0.98 or more may be obtained. The direction of the applied magnetic field is preferably parallel to the condensation surface and is the preferred or "easy" direction of magnetization of the condensation. In such a magnetic field, the condensation resulting may be a thin magnetic film. For example, it is possible to obtain films of single domain thickness which may be not only more than two to three thousand Angstrom units thick but down to even less than 100 Angstrom units.

The magnetic material found to be most satisfactory in the practice of this invention is a ferro-magnetic alloy consisting essentially of iron and nickel, the percentage of nickel ranging from about 75 to 85%. A film of optimum composition is determined by actual test of the evaporated film produced, and the finished product is judged to be of optimum alloy proportions when it exhibits zero magnetostrictive effect under actual test. The term magnetostrictive effect may be defined as the degradation of rectangularity of the hysteresis loop upon the application of either tension or compression to the film. Experience has shown that a preferable iron-nickel alloy composition to achieve this result lies in the neighborhood of 82.75% nickel, ±0.5% due to random variations which cannot be measured.

When magnetic materials of other than the above mentioned optimum composition are used, it may be desirable to subject the condensation to an annealing sequence. It will be recognized that subsequent annealing of the condensation is merely a part of the annealing history of the original magnetic material since the initial evaporating and condensing in effect anneal the material. However, subsequent annealing may be desirable to modify the residual strain and coercivity of the condensation, and it has been discovered that such may be done not only by subjecting the condensation to an annealing sequence but doing so while the condensation is in a magnetic field.

The invention also encompasses condensing the material onto a substrate surface which is preferably smooth and formed of glass. In addition, it is desirable that the surface be heated before evaporation to the surface and condensation thereon takes place.

Magnetic memory elements of the sort employed in presently known-coincident-current memories are usualy comprised of a material characterized by a quasirectangular hysteresis loop. When the remanent magnetization of such an element is altered in sign by the application of a magnetic field of the appropriate direction, the state of the core is said to be switched, and the time required for this process is referred to as the switching time $t_s$ is an inverse function of the difference in magnitudes of the applied field, $H_{max}$, and the coercive force, $H_c$, of the material. It may be defined as the time elapsed between the time that the field H reaches the value $H_c$ and the time that the output E.M.F. observed on a sense winding threading the element is reduced to 10% of its maximum value. In this application, in general, the greater the coercive force, the larger can be the difference $H_{max}-H_c$, and correspondingly the shorter the switching time $t_s$ provided the hysteresis loop remains rectangular to the same degree.

With the ferrite materials currently used in coincident-current memories, it is very difficult to increase the coercivity without losing the required degree of rectangularity, and even if this could be accomplished, the power losses encountered in the use of such materials are so great than an increase in coercivity would make the power required to drive such cores prohibitive unless their dimensions were reduced to impractical values.

With the Ni-Fe alloy films containing 75–85% Ni condensed in the presence of a magnetic field, the degree of rectangularity is very high and the coercive force can be controlled over the range 0.1 to 10 oersteds by varying the thickness of the condensate from a few hundred to 5000 Angstrom units and by controlling the temperature of the substrate during the deposition process. In general, the lower the substrate temperature, and the thinner the film, the greater will be the coercive force.

Therefore, it is the primary object of this invention to provide an improved method for making magnetic material by condensing evaporated magnetic material in the presence of a magnetic field.

Another object of this invention is to provide a magnetic material made in accordance with the process in the preceding paragraph.

Another object of this invention is the provision of an evaporating method for forming on a surface in a vacuum in the presence of a magnetic field a film of extremely thin magnetic material exhibiting exceptional switching properties and a rectangular hysteresis loop having a squareness ratio of substantially unity.

In addition to the preceding object, a further object is the annealing of magnetic material formed by any of the preceding methods to modify the residual strain and coercivity thereof, preferably while in a magnetic field.

Another object of the invention is the provision of a process of forming a film of magnetic material exhibiting the property of having negligible magnetostrictive effect, if any, in the preferred direction of magnetization.

A further object of the invention is the provision of magnetic films made in accordance with any of the processes hereinabove stated.

Still other objects of this invention will become apparent to those skilled in the art by reference to the following detailed description of exemplary embodiments of the processes and resulting articles and the appended claims. The various features of the exemplary embodiments according to the invention may be best understood with reference to the accompanying drawing, wherein:

Figure 1:
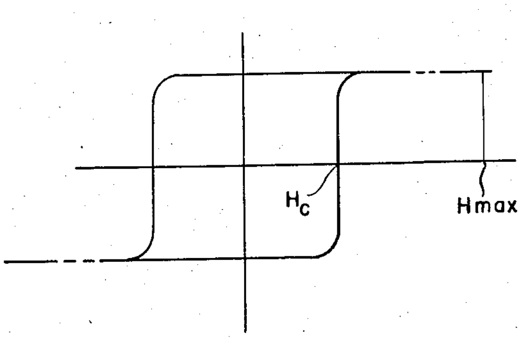
Figure 1 shows a hysteresis loop.

Figure 1 serves to illustrate the relationship of time $t_s$ to the applied field and coercive force as mentioned hereinabove.

Figure 2:
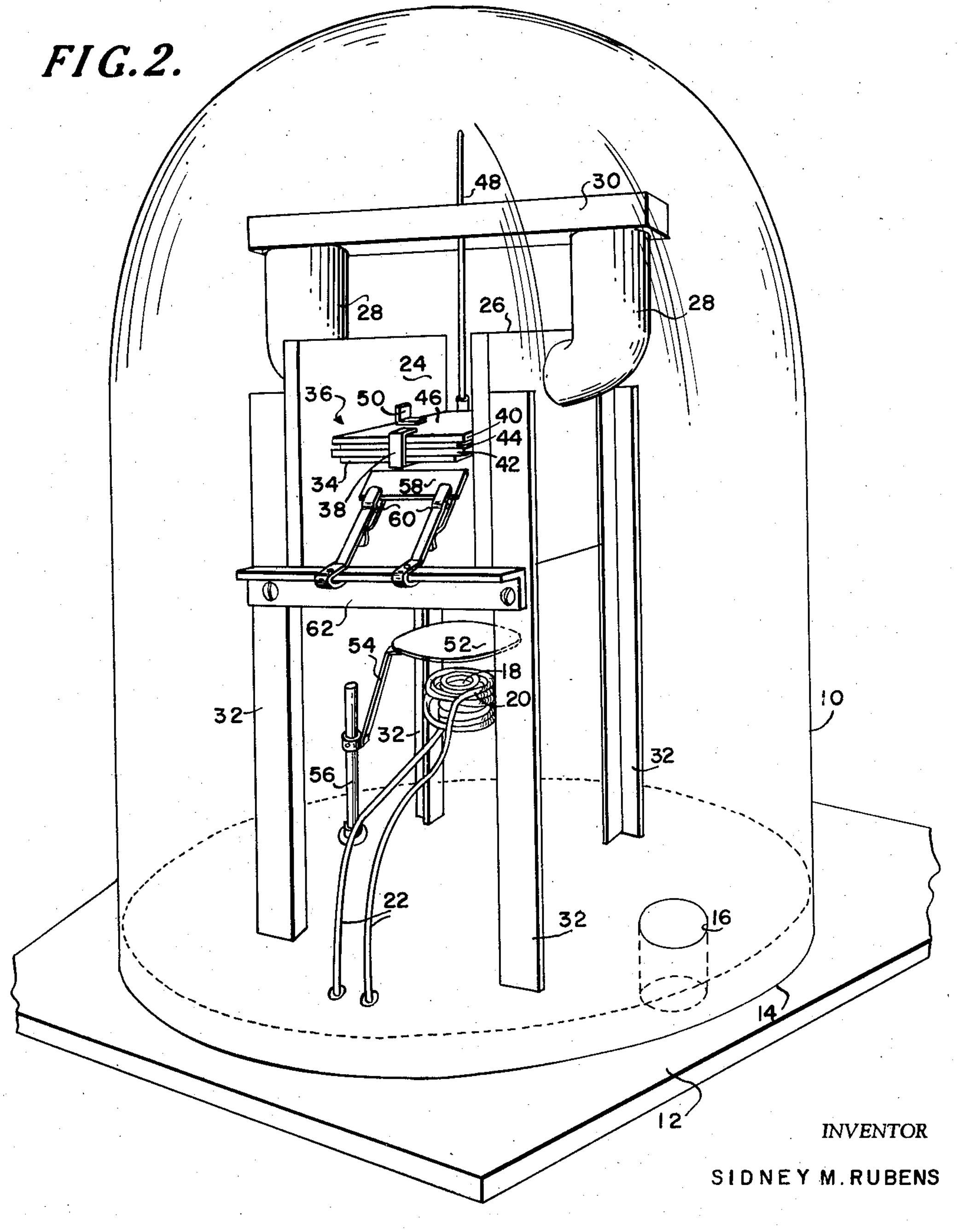
Figure 2 shows in a perspective view one form of apparatus by means of which the invention may be practiced.

No particular apparatus need be used to perform the method of this invention. However, exemplary apparatus is now described to aid in an understanding of the complete method. Such apparatus, as shown in Figure 2, may comprise a bell jar 10 mounted on a supporting plate 12 sealed at rim 14 between the jar and the plate. In the practice of this invention, a vacuum pressure in the range of $5\times10^{-5}$ to $1\times10^{-4}$ millimeters of mercury may be maintained in the jar, as by connecting its interior to a vacuum pump (not shown) through a conduit 16 leading through the supporting plate.

The ferromagnetic material to be melted (hereinafter referred to as the "melt") in the amount of 20 grams or more is placed in a crucible 18, preferably alumina which is inductively heated by a high frequency induction heating work coil 20 composed preferably of hollow, soft copper tubing for water cooling purposes. The energy necessary for operation of the work coil 20 is transmitted thereto over water-cooled tubes 22 which are fed through the base plate 12, preferably with a glass flange (not shown) which is sealed against leaks by use of rubber gaskets or the like.

A strong magnetic field is produced between two pole pieces 24 and 26 by the yokes 28 interconnected by permanent magnet 30. The magnetic structure is held in the position illustrated by four right angle legs 32, two of which are suitably connected to each pole piece 24, 26.

To achieve greater versatility in control of the magnetic field used during evaporation, an electromagnetic yoke structure may be used instead of the permanent magnet illustrated. The field produced by an electromagnet with pole areas approximately 6 inches by 10 inches and a useful gap dimension of 5 inches is uniform, and field strengths up to 400 oersteds have been obtained with success. With the same pole areas and gap dimensions for a permanent magnet, the field produced has a value of approximately 100 oersteds at the geometric gap center.

The substrate and its lower surface (neither shown) upon which condensation occurs as a mass or film the area of which is determined by a thin copper mask 34 are held to the lower side of a substrate heater 36 by a holder 38. The substrate heater may have upper and lower mica-insulated copper plates 40 and 42 sandwiching tantalum heater element 44. In addition, the upper copper plate 40 may be covered by a glass plate 46 to reduce heat energy loss. A substrate heater of this type has a comparatively high heat capacity and produces a substantially uniform temperature. To determine the temperature produced by the heater, a thermometer 48 ranging from 0 to 500° C. may be suitably attached by embedding its lower end in a thermal conductor mounted on the lower copper plate 42. Preferably a small thermocouple is used for this purpose.

The substrate heater 36 along with the masked substrate is positioned horizontally between the pole pieces 24, 26 with thermally insulated supports 50 attached to the pole pieces so that the lower substrate surface will be in the center of the gap where the field is the most uniform. The power supply (not shown) for the heater element may be as desired. A Variac controlled supply from a 0–40 volt transformer was found to suitably supply a substrate temperature of 300° C. to 400° C.

Figure 3:
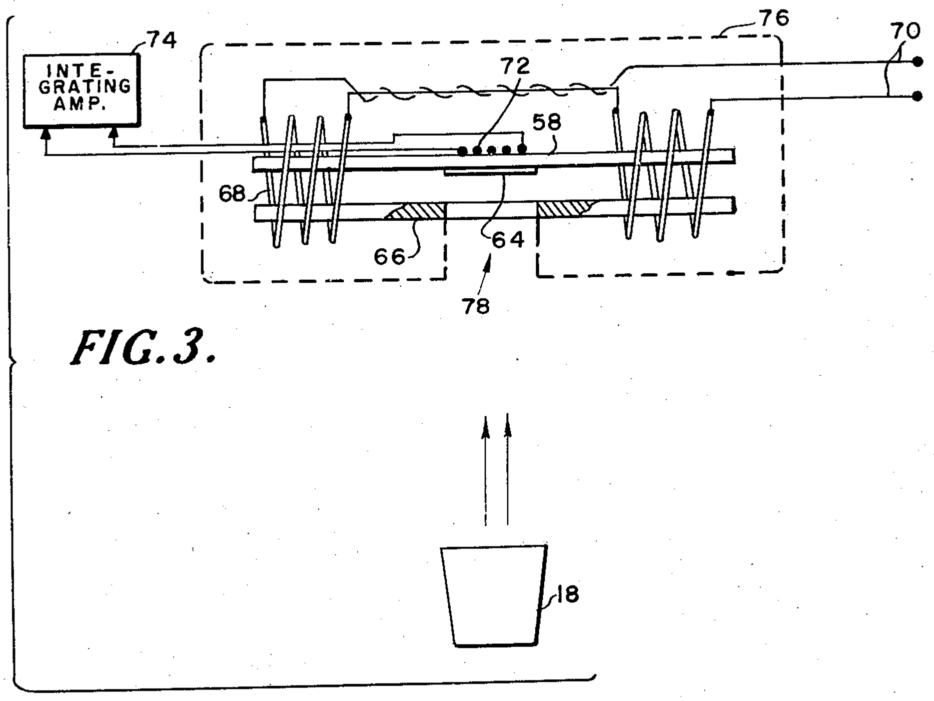
Figure 3 shows an inductive monitoring arrangement.

A rotatable shielding gate such as a flat copper disc 52 is provided to cover the work coil so that the melt will not condense on the substrate until the proper rate of evaporation is obtained from the crucible. Such shielding gate is desirable for premelting alloys and for close control of thickness and quality of evaporation. The disc 52 is connected by a stem 54 to a shaft 56 which sealingly passes through base plate 12 for external rotation of the gate 52. To determine the thickness of the film deposited on the substrate, a monitor 58 such as a glass slide is provided. Both ends of the monitor 58 are silvered and are connected to electrical connectors 60 which are also attached to cross bar insulator 62 from which leads (not shown) go to external means for measuring the resistance between the ends of the glass slide, and thereby measuring the effective thickness of the film deposited. A preferred method of determining the effective thickness of the film is to subject the condensed film on the monitor slide to an alternating magnetic field and to integrate, with respect to time, the E.M.F. induced in a search coil in close proximity to the film as shown in Figure 3. The maximum integrated E.M.F. is then proportional to the saturation flux of the film which for a given film width and composition is determined by the effective thickness.

In Figure 3 the monitor surface 58 is shown with a condensate film 64 of the magnetic material thereon, defined by brass mask 66. A Helmholz coil 68, energized by alternating current from leads 70, induces voltages in a flat pick-up coil 72 opposite the condensate film 64. E.M.F. from coil 72 is integrated in integrating amplifier 74. The assembly is placed within an iron shield 76 which has a window 78 to admit the vapors to be condensed from the crucible 18.

The substrate temperature has an important effect upon both the magnetic and other physical properties of the metal film deposited thereon. Such temperature may be caused to vary by several agencies. The substrate heater 36 of relatively high thermal capacity tends to maintain the substrate and its holder temperature constant. The thermometer affixed thereto indicates with considerable time lag a minimum of variation in temperature during the evaporation, provided the thermometer has previously been allowed to reach equilibrium. Actual substrate temperature at the field will not, in general, reflect mere thermal equilibrium with the mask of the heater, but it will suffer changes due to energy received from the melt by bombardment during the evaporation process. The temperature changes so suffered are of great interest, and assuming a substrate heater temperature of 300° C. and an evaporation time of 60 seconds, by calculation or by measurements made with thermocouples mounted at the surface of the substrate, the increase in temperature is in the order of 20.8° C. This ignores the effect of using a thin copper mask which would receive energy from the melt at an equal rate as the substrate. Therefore, the copper mask, which has a lower specific heat and mass than a glass substrate, reaches a higher temperature than the substrate itself.

To minimize the temperature increase due to the thin copper mask, to obviate the large temperature differential between the substrate and substrate heater, and to improve in general the validity of the thermometer reading with respect to both time lag and thermal contact to the substrate holder, a substrate heater-holder unit different from that illustrated may be employed. For example, using a similar substrate heater but a relatively thick non-metallic mask holder which has holes milled in it to register with those of the copper mask for exposing the substrate, the copper mask is subject to a much less bombardment temperature increase, since a holder of this type largely eliminates any temperature increase in the mask during evaporation. The holder also helps to maintain the substrate at more nearly the substrate heater temperature. Good thermal contact between the heater and the substrate is maintained, and the thermometer well more exactly registers the temperature of the substrate.

The substrate material has preferably a reasonably smooth lower surface on which the magnetic film may be deposited. The surface need not be perfectly flat and may be undulatory as long as there are no small scale scratches, pits, or bumps. Therefore, glass-like materials may be utilized as substrates. Preferably the substrate material has a coefficient of thermal expansion approximating that of the melt. Ordinary microscope slide glass has proved to be satisfactory so long as it is kept free and clean of any foreign matter. Since the substrate is normally subjected to a temperature up to perhaps 500° C. by the substrate heater 36, Pyrex glass may be used as the substrate material. Other dielectric materials such as Mylar, mica, etc., have also been used successfully. In addition, there may be the additional requirement that the substrate should withstand temperatures up to 1000° C. since annealing of the film in or out of a strong magnetic field is subsequently necessary in certain cases to reduce the residual strain and high coercivity of the deposited film when the melt was not originally of a composition which caused such factors to be negligible. Pyrex glass is, or course, suitable for such annealing temperatures. For evaporation without subsequent annealing, film deposits may be made on Mylar or Teflon ranging from 1.5 to 8 mils thickness with a satisfactory degree of success.

In addition to the above described induction heating method of evaporating the melt, a tungsten filament technique for evaporation may also be used. For example, a filament of approximately 0.056 inches in diameter of tungsten wire 3 inches long positioned about 3 inches from the substrate will suitably evaporate melt powder or strips placed on the filament. The problems of crucible impurities and outgassing are eliminated by this method of evaporation.

In carrying out the process, it is preferred that the substrate material be cleaned prior to evaporation. Therefore, the bell jar may be suitably evacuated, and when the proper substrate temperature has been obtained, the melt may be evaporated and condensed onto the substrate with the magnetic field applied. After the mass of resulting magnetic material has cooled suitably, annealing may then be accomplished as desired.

The ferromagnetic melt preferably used to obtain a film of magnetic material for use in magnetic cores or a memory unit of same is a binary alloy such as Permalloy having 75% to 85% nickel and the remainder iron, impurities being substantially negligible. It has been discovered that any initial composition of these two elements tends toward a fixed melt composition upon successive evaporations into different films, i.e., upon continued boiling at a constant pressure. The fixed composition is in the region of 83% nickel and 17% iron. Melts more nickel rich than 83% nickel, 17% iron result in films even more nickel rich. Therefore, the melt becomes relatively more iron rich and approaches 83% nickel, 17% iron. Conversely, from melts more iron rich than 17%, the films are even richer in iron so that the melt tends to become relatively richer in nickel and again approaches the optimum composition of 83% nickel and 17% iron. It has been found that such a composition is also optimum in its magnetostrictive effect, since its magnetostriction is negligible if not zero in the preferred direction of magnetization. The average composition of non-magnetostrictive films resulting from 83% nickel, 17% iron melts was found to be about 82.75±0.50% nickel and the remainder iron. However, other combinations of nickel and iron melts produce films which have desirable magnetic properties and such are intended to be within the scope of this invention.

Rate of evaporation of the melt is another variable along with film thickness and composition, magnetic field intensity and substrate temperature which needs to be accurately controlled for uniform films. The vacuum pressure, size of melt, and amount of contamination in the melt from the crucible, all affect the rate of evaporation, but it has been found that grinding the melt clean after each evaporation and keeping it to a minimum of 20 grams have eliminated most of the variations in the rate of evaporation. The evaporation time is normally around 50 seconds, but has been reduced to 15 seconds under certain conditions, while under others, 100 seconds may be required.

It has been found that for nickel-iron alloy films of a given composition deposited on glass, the coercivity depends both upon the film thickness and the temperature of the glass substrate during the deposition process. In general, the thicker the film, and the higher the substrate temperature the lower will be the coercivity of the film. For example, films of optimum iron-nickel alloy composition characterized by zero magnetostrictive effect when condensed on a glass substrate held at 300° C.±10° have a coercive force ranging from 0.6 to 1.2 oersteds depending upon thickness and the schedule of cooling from the deposition temperature. A typical film 2000 Angstrom units thick condensed at 300° C. has a coercive force of one oersted measured at 60 cps. It may be desirable to modify the coercive force of a film by subsequent annealing, preferably in a strong magnetic field.

As an illustrative example, without limitation thereto intended, preparation for the process and carrying out the method in the illustrated apparatus has been as follows:

The glass substrate material was first washed in a detergent, then rinsed thoroughly in distilled water and again washed in a solution of potassium dichromate and sulphuric acid. After the substrate was chemically cleaned, it was again rinsed in distilled water, dried, and any remaining dust particles were removed by a staticless bristle brush. The substrate was then placed in a mask which was clamped to the substrate heater. About 24 grams of a melt consisting essentially of 83% nickel and 17% iron were placed in the crucible in the work coil and the bell jar was sealed and evacuated to a pressure of about $10^{-5}$ millimeters of mercury. The substrate was heated to approximately 400° C. and then reduced to 300° C. The melt was heated to about 1600° C., while the magnetic field produced by the permanent magnet was about 92 oersteds. The gate was held closed for a few minutes since fractional distillation is greater when evaporation first starts. After the gate was opened, evaporation was occurring at the rate of about 2400 Angstrom units per minute. In about 50 seconds, the monitor slide apparatus indicated a resistance corresponding to a thickness of 2000 Angstrom units and the gate was closed. The resulting film was allowed to cool and its composition was ascertained to be about 82.2% nickel, 17.8% iron. The film exhibited substantially no magnetostriction and had a rectangular hysteresis loop of squareness near unity. Its coercivity was about 1 oersted.

In another example following the process of the above example but using 80% nickel, 20% iron, the resulting film was allowed to cool to approximately 200° C. and then annealed in a strong magnetic field. The characteristics of the annealed film were found to be very close to those for Example 1.

The "magnetic field" as used in the claims may be stronger than those indicated hereinabove or may be considerably less as desired, but in all cases, whether relative to the condensing magnetic field or the annealing magnetic field, more than the earth's magnetic field is intended.

It will be apparent that the process or method of the invention does not in every case require all of the steps described hereinabove. Therefore, the various inventive features are to be construed from the recitations of the several appended claims.

What is claimed is:

1. In a method for the vacuum deposition of a metallic film onto a di-electric substrate, the improvement which comprises preheating said substrate to an elevated temperature below the melting point thereof, applying a magnetic field across at least one surface of said substrate in a direction parallel thereto while vaporizing in said vacuum an alloy having about 83% nickel and the remainder iron, and maintaining the temperature of said substrate in the course of said vaporizing in the range of from about 300° to 400° C. until a thin bistable magnetic film having a thickness up to 5000 Angstrom units and a coercivity up to 10 oersteds is deposited on said surface of the substrate, the method being such that said magnetic film has a preferred direction of magnetization in a direction parallel to the direction of said magnetic field and exhibits substantially no magnetostriction in said preferred direction but has single domain properties.

2. A bistable magnetic film made in accordance with the method of claim 1.

3. A method as in claim 1 and further including the step of subjecting said bistable magnetic film to an annealing sequence in a magnetic field subsequent to its deposition onto said substrate.

4. A bistable magnetic film made in accordance with the method of claim 3.

5. A method for the production on a substrate of a bistable magnetic film having a thickness less than 5000 Angstrom units and a coercivity less than 10 oersteds, and having a preferred magnetization parallel to the film, which comprises, evaporating in vacuum a nickel iron binary alloy having from 75 to 85% nickel, maintaining the substrate at an elevated temperature, applying a magnetic field across at least one surface of said substrate in a direction parallel thereto, and condensing the evaporated alloy onto the said one surface as said film.

6. A bistable magnetic film made in accordance with the method of claim 5.

7. A method as in claim 5 wherein the substrate is maintained at a temperature in the order of 300 to 400° C. during said condensing.

8. A method as in claim 5 and further including the step of pre-heating said substrate to an elevated temperature below the melting point thereof before said evaporating.

9. A method as in claim 5 wherein the nickel content of said binary alloy is in the order of 83%.

10. A method as in claim 5 and further including the step of subjecting the condensed alloy film to a subsequent annealing sequence while in a magnetic field.

11. A bistable magnetic film made in accordance with the method of claim 10.

12. A method as in claim 5 and further including the step of measuring the thickness of the film during the said condensing thereof by measuring the maximum magnetic flux in a similar film on a monitoring element.

13. A method for the production on a substrate of a bistable magnetic film having a thickness less than about 5000 Angstrom units and a coercivity less than about 10 oersteds, and having a preferred direction of magnetization parallel to the film, which comprises, evaporating in vacuum a nickel iron binary alloy having from 75 to 85% nickel, condensing the evaporated alloy onto one surface of said substrate as said film, maintaining the substrate during said condensing at an elevated temperature, applying during said condensing a magnetic field across at least said one substrate surface in a direction parallel thereto to cause said preferred direction of magnetization, and terminating said condensing before the coercivity of the resultant film exceeds 10 oersteds.

References Cited in the file of this patent

UNITED STATES PATENTS

| | | |
|---|---|---|
| 1,462,035 | Fondiller | July 17, 1923 |
| 2,167,188 | Schaarwachter et al. | July 25, 1939 |
| 2,432,657 | Colbert et al. | Dec. 16, 1947 |
| 2,622,041 | Godley | Dec. 16, 1952 |
| 2,665,224 | Clough et al. | Jan. 5, 1954 |
| 2,676,298 | Frommer | Apr. 20, 1954 |
| 2,691,072 | Mathes | Oct. 5, 1954 |
| 2,714,363 | Speed et al. | Aug. 2, 1955 |
| 2,751,552 | Brenner et al. | June 19, 1956 |

FOREIGN PATENTS

| | | |
|---|---|---|
| 511,164 | Great Britain | Oct. 25, 1937 |
| 670,993 | Great Britain | Apr. 30, 1952 |
| 673,824 | Great Britain | June 11, 1952 |

OTHER REFERENCES

Sowter: The Institution of Electrical Engineers, "High Permeability Magnetic Alloys," vol. 98, No. 61, February 1951, pages 5–8. (Page 6 relied on.)